Dec. 17, 1957 W. W. PHARIS 2,816,957

TELEPHONE SYSTEM

Filed Jan. 9, 1953 4 Sheets-Sheet 1

INVENTOR.
WILLIAM W. PHARIS
BY
T. L. Bowes
ATTORNEY

Dec. 17, 1957 W. W. PHARIS 2,816,957
TELEPHONE SYSTEM
Filed Jan. 9, 1953 4 Sheets-Sheet 2
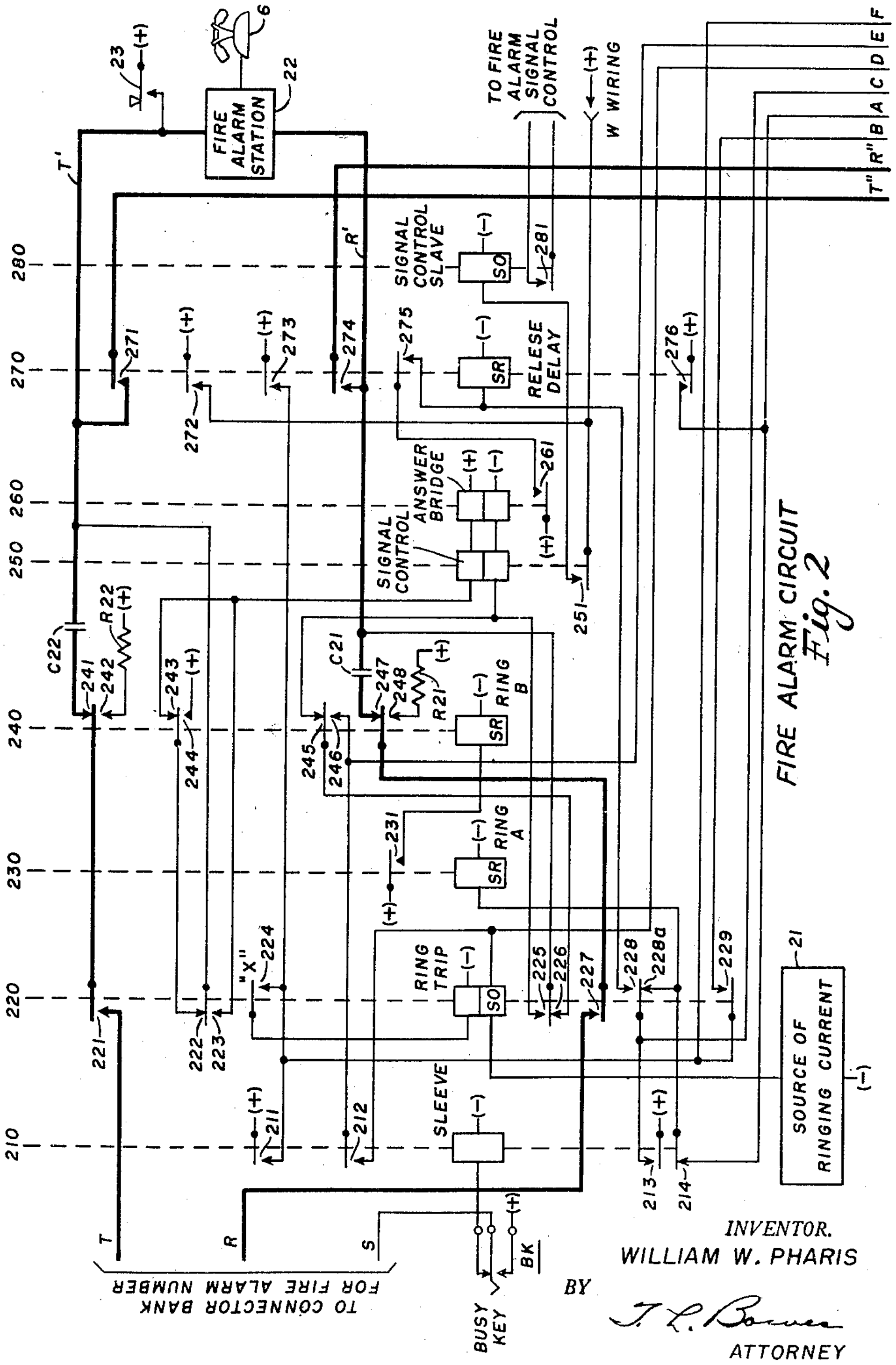
FIRE ALARM CIRCUIT Fig. 2
INVENTOR.
WILLIAM W. PHARIS
BY T. L. Bowes
ATTORNEY Dec. 17, 1957 W. W. PHARIS 2,816,957

TELEPHONE SYSTEM

Filed Jan. 9, 1953 4 Sheets-Sheet 3

INVENTOR.
WILLIAM W. PHARIS
BY T. L. Bowes
ATTORNEY

TELEPHONE SYSTEM

Filed Jan. 9, 1953 4 Sheets-Sheet 4

INVENTOR.
WILLIAM W. PHARIS
BY T. L. Bowes
ATTORNEY

United States Patent Office 2,816,957

Patented Dec. 17, 1957

2,816,957

TELEPHONE SYSTEM

William W. Pharis, Rochester, N. Y., assignor, by mesne assignments, to General Dynamics Corporation, a corporation of Delaware Application January 9, 1953, Serial No. 330,421

9 Claims. (Cl. 179—5)

My invention relates to automatic telephone systems and more particularly to alarm circuits for use in telephone systems. Telephone systems have been proposed heretofore wherein circuits are provided to enable one of a number of subscribers, by means of a conventional dial or other impulse transmitting arrangement, to extend a call through conventional switching apparatus to an alarm station. Systems of this type have been particularly useful in connection with volunteer fire fighting systems wherein a subscriber calls a fire station operator who thereupon sounds or otherwise causes the sounding of a suitable alarm signal. Thereafter volunteer firemen by dialing a predetermined digit or series of digits may extend a call from any substation in the system to the alarm operator in order to determine the location of the fire.

It is an object of my invention to provide a new and improved alarm circuit for use with telephone systems.

Another object of my present invention is to provide in an alarm telephone system an arrangement whereby the alarm station is never rendered busy to a calling subscriber, such as a volunteer fireman, when a predetermined impulse or series of impulses is transmitted from the checking substation.

Still another object of my invention is to provide a telephone system including alarm circuits wherein the conventional connector is not held busy if the line originating the alarm call disconnects before the alarm station disconnect operation is performed.

Still another object of my invention is to provide an alarm system wherein during the period following disconnect by a previous calling subscriber but before disconnection at the alarm station a second subscriber may be connected to the alarm station without waiting for disconnect at the alarm telephone station.

Figure 1:
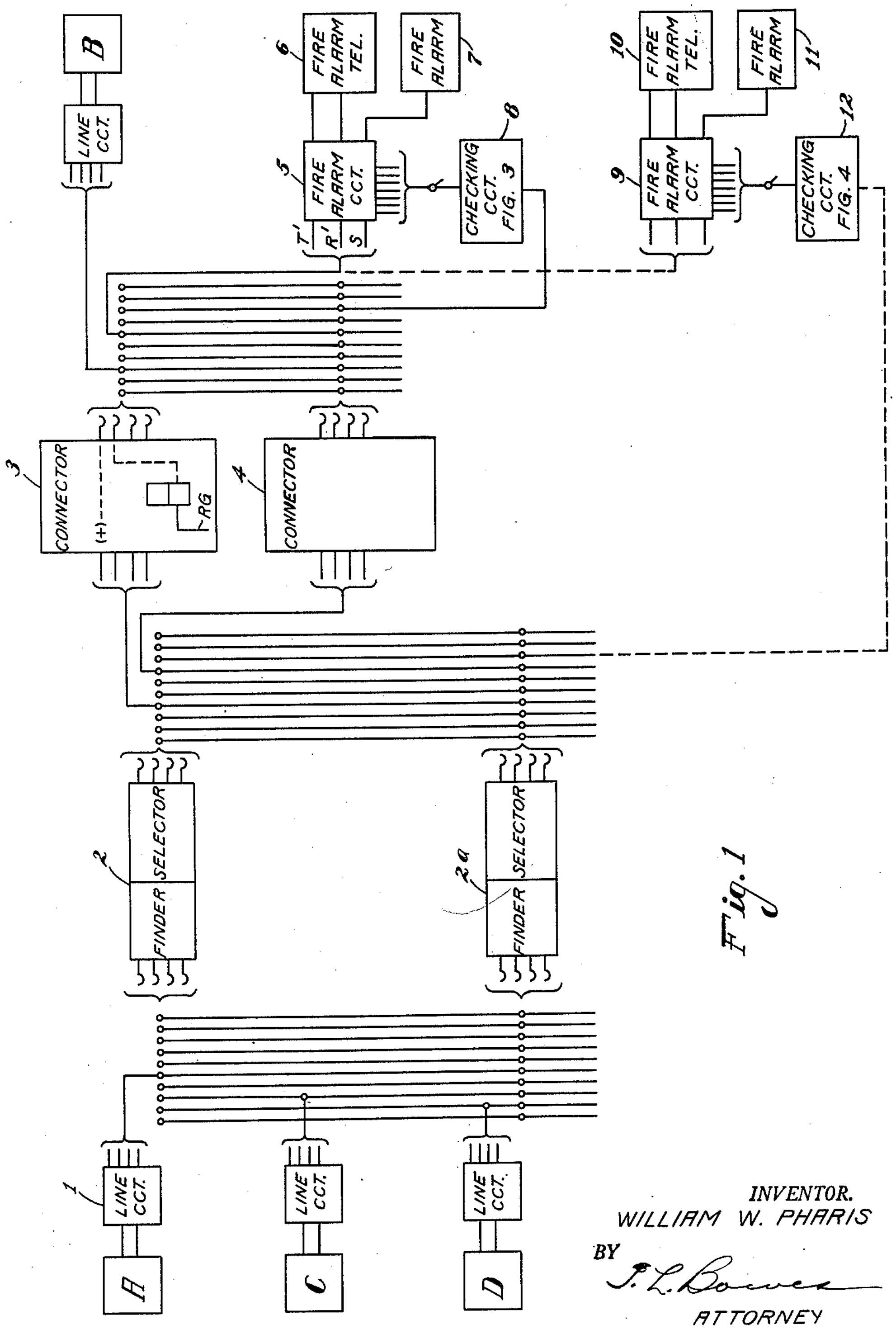
Figure 4:
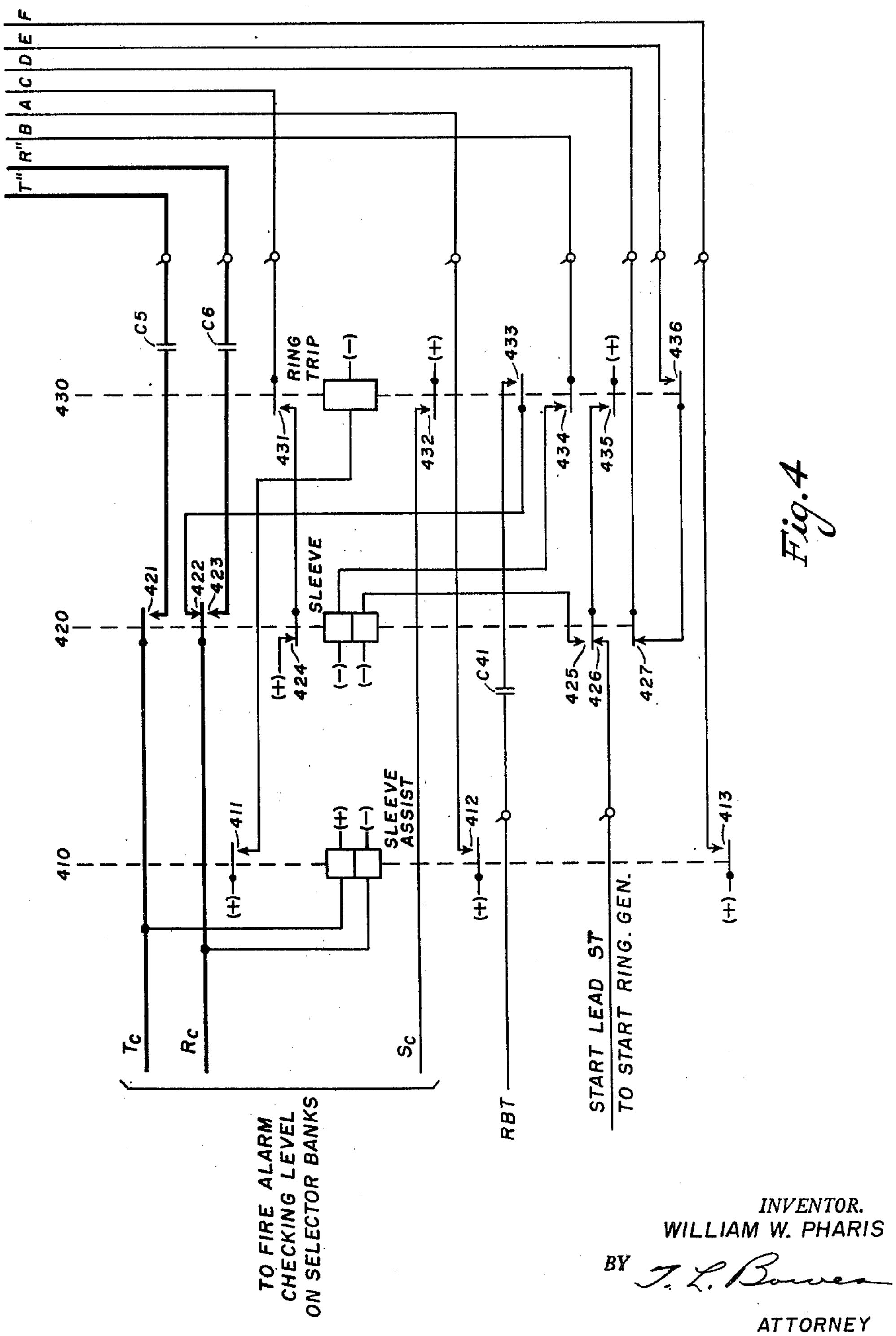
Figure 3:
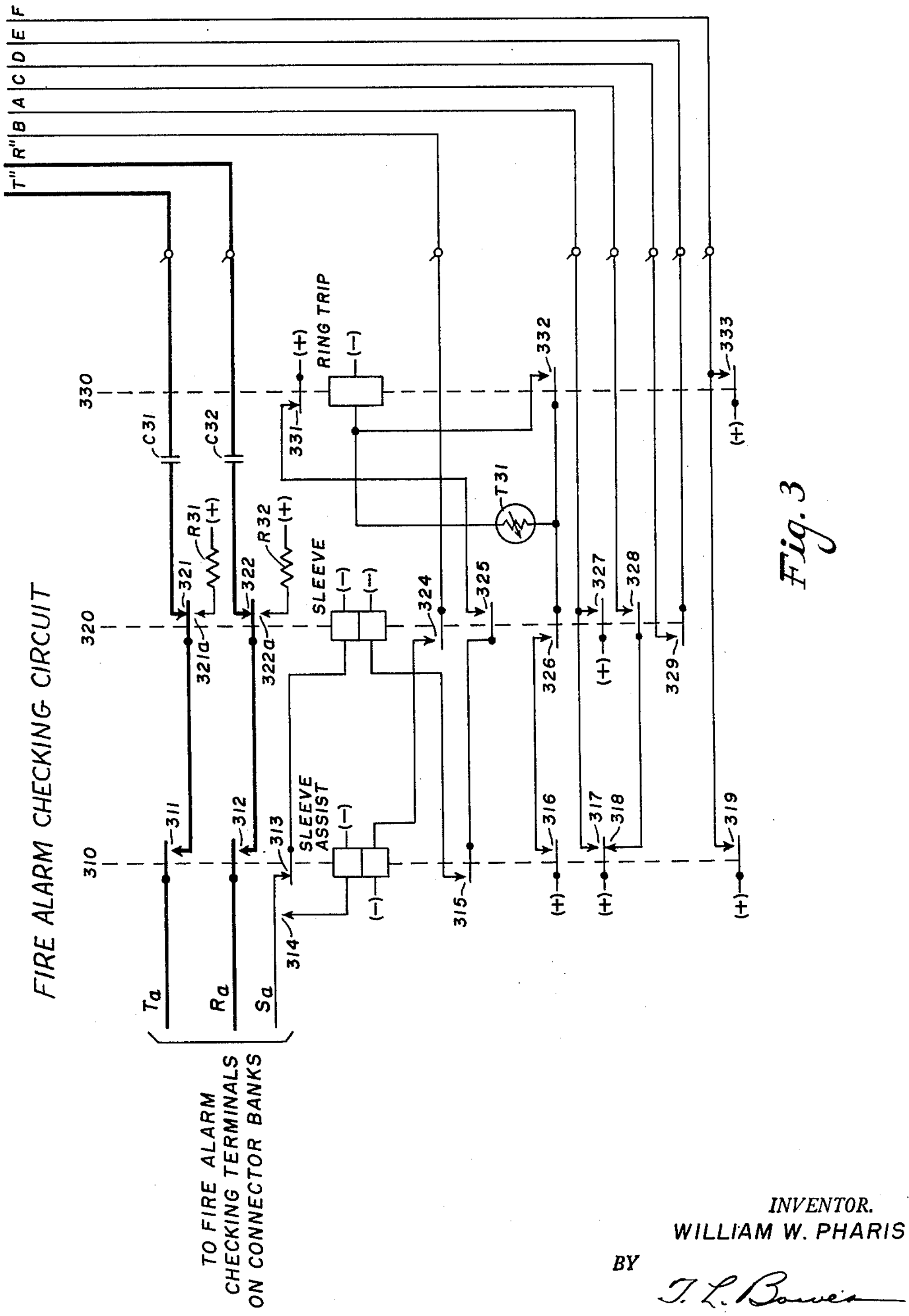

Other objects and advantages of my invention will become apparent from the accompanying description and drawings in which Fig. 1 is a block diagram showing the elements of a telephone system embodying the principles of my alarm system, Fig. 2 illustrates in detail an alarm circuit for use in Fig. 1, and Figs. 3 and 4 illustrate suitable alarm checking circuits for use in this system shown in Fig. 1.

Referring to Fig. 1, there is shown a system having a plurality of subscribers' stations A, B, C, and D. In order to extend a call from a calling subscriber such as indicated by A to another subscriber station, such as B, it may be noted that each subscriber is connected to a suitable line circuit 1. Upon the initiation of a calling condition at one of the substations, such as A, a suitably allotted finder-selector link 2 is caused to seek the calling line in the wire banks of the finder-selector units. Thereafter, upon the proper transmission of impulses from a suitable sending device at substation A, such as a conventional dial, for example, the selector of the link 2 is caused to advance to a predetermined level of the selector wire bank, such as level 4, for example, and then to hunt in the selected level for an idle connector, represented in Fig. 1 by the numeral 3, for example. Upon the dialing of the station identification digit, the connector switch forming part of the connector system designated by the numeral 3 is caused to advance to the suitable level and the suitable contact within the level corresponding to substation B.

In the telephone system described herein, there is provided an alarm station. The particular arrangement described and illustrated herein is designed for use in communities employing a volunteer fire department whereby the calling subscriber calls the fire station alarm operator by dialing the assigned directory number. In Fig. 1 the fire alarm station or telephone 6 is reached through a suitable fire alarm adapter circuit 5 connected into one of the levels of the connector wire bank, as for example level 6. Upon receiving the information required to locate the alarm, the operator at the fire alarm telephone 6 operates, in some suitable manner, the fire alarm indicated by the numeral 7. Thereafter, the volunteer firemen by dialing a predetermined number in the conventional manner are enabled to reach the fire alarm circuit 5 through a suitable fire alarm checking circuit 8 from alarm checking stations, which may be any of the subscribers' lines or a special line. For example, the subscriber at substation C may communicate with alarm telephone 6 by way of finder-selector link 2*a*, connector 4 and checking circuit 8.

It is generally desired, in connection with my invention, to use connector levels for the alarm checking function in order to avoid removing selector units from service. However, trunk hunting connectors are required to employ my invention economically, and if the system involved does not have trunk hunting connectors or in cases where there are selector levels available for fire checking service, it is entirely feasible to apply the principles of my invention to carry out the checking function from the selector bank as indicated in Fig. 1 by the dashed lines. Thus a calling subscriber who wishes to apprise the fire alarm operator of a fire can reach fire alarm circuit 9 by way of connectors 3 and 4. The volunteer firemen may reach the fire alarm operator at fire alarm telephone 10 by way of checking circuit 12 through the selector wire bank associated with the finder-selector links.

For a detailed description of the extension of a call to fire alarm telephone 6 and alarm checking by way of the connector levels, i. e., by way of checking circuit 8, reference is made to Figs. 2 and 3.

Let it be assumed that a call from subscriber A has been extended to connector 3 and that the connector has reached a position in the wire bank corresponding to fire alarm circuit 5. Under this condition, the connector switch associated with connector 3 has connected the tip, ring, and sleeve brushes to the tip, ring, and sleeve leads T, R, and S, respectively, of Fig. 2. Ground is extended from connector 3 on lead S in any suitable manner (not shown) in order to operate sleeve relay 210 by way of the normal contacts of busy key BK.

Responsive to the operation of sleeve relay 210, a circuit is completed for operating ring A relay 230 over a circuit extending from ground at operated contacts 213 through normal contacts 228*a* and the winding of relay 230 to battery (—). At this point, it may be noted that in this specification, the exchange battery is considered to have its positive terminal grounded, the grounded positive terminal being indicated in the drawings by the symbol (+) and the negative terminal of the station battery is indicated by the symbol (—).

In response to the operation of relay 230, ring B relay 240 is operated over an obvious circuit through operated contacts 231. Upon the operation of relay 240, a circuit is completed for applying the ringing signal from a suitable source of ringing current 21 to the telephone 6 at fire alarm station 22, the circuit extending from source 21 through the lower winding of relay 220, operated contacts 212 and 246, normal contacts 226 and ring lead R′ to the fire alarm station 22. The return connection from the loop at fire alarm station 22 includes tip lead T′, normal contacts 222 and operated contacts 244 to ground. Thus, the fire alarm station bell or signal operates.

When the fire alarm operator answers, the alarm station loop is closed in conventional fashion to trip ring trip relay 220 conventionally over the loop previously described in connection with the ringing of the fire alarm station. In response to the operation of ring trip relay 220, relay 220 locks through its upper winding and operated contacts 224 to ground at operated contacts 211; de-energizes relay 230 at now open contacts 223*a*; closes resistance grounds to the back ring and tip leads, R and T, respectively, through suitable resistors R21 and R22 and operated contacts 248 and 242, respectively, by way of operated contacts 227 and 221, respectively, in order to trip ringing in the connector, the resistance of resistors R21 and R22 being sufficient to prevent the operation of the answer bridge relay in the connector; and effects the operation of release delay relay 270 through operated contacts 228 and 213.

In response to the operation of relay 270, an alternate ground for holding ring trip relay 220 is provided at operated contacts 273.

It was noted above that relay 230 was de-energized upon the operation of ring trip relay 220. Relay 230 is made slow-to-release. Upon the release of relay 230, the energization circuit for slow-to-release 240 is opened and relay 240 releases after a predetermined time. The release of relay 240 transfers the forward tip and ring leads T′ and R′, respectively, to the back tip and ring leads T and R, respectively, at normal contacts 241 and 247, respectively, through transmission capacitors C22 and C21, respectively. The release of relay 240 also connects signal control relay 250 and answer bridge relay 260 to the called loop, the upper windings of these relays being connected in series through operated contacts 223 to the tip lead T′ and the return loop including lead R′, operated contacts 225, and the lower windings of relays 250 and 260 in series to battery. Relay 250 is differentially wound and hence does not operate at the present time. Answer bridge relay 260, not being differentially wound, operates and establishes a locking circuit for relay 270 through operated contacts 261 and 275.

The operator at fire alarm station 22 elicits the information from the calling subscriber regarding the alarm. Means is provided at fire alarm station 22 to operate suitable alarm apparatus. For example, a key 23 may be provided for grounding tip lead T′ at the option of the alarm operator. The appearance of ground on lead T′ shunts the upper winding on relay 250 by applying ground from lead T′ through operated contacts 223 to one terminal of relay 250, the other terminal being connected to ground through the upper winding of relay 260. The lower winding of relay 250 is connected between battery through the lower winding of relay 260 and ground through operated contacts 225, ring lead R′, and the fire alarm station loop back to battery at key 23 so that relay 250 now operates.

In response to the operation of relay 250, a circuit is completed for operating signal control relay 280 through operated contacts 251 and 272. The operation of relay 280 effects the closure of contacts 281 in order to energize a suitable alarm circuit (not shown). Relay 280 is preferably slow-to-operate so that the alarm will not be energized upon momentary surges and the like.

As soon as the information regarding the alarm situation is transmitted by the calling subscriber to the alarm station operator, the calling party can hang up or disconnect, thereby effecting the removal of ground on lead S into the fire alarm circuit 5 in a conventional manner, thereby releasing sleeve relay 210 which results in the removal at contacts 211 of one ground connection holding ring trip relay 220, relay 220 remaining held operated from ground at contacts 273. The release of relay 210 again operates relay 230 by way of normal contacts 214 and operated contacts 276. Relay 240 is re-operated in response to the re-operation of relay 230 in an obvious manner.

Inasmuch as there is described herein a volunteer system, a volunteer fireman or the like, upon hearing the alarm signal, can call in to determine the location of the fire by dialing a predetermined alarm checking number. Assuming that the alarm checking is accomplished through the connector circuits, and that the volunteer has dialed the special checking number, which is different than the alarm number, a connector such as connector 3 is advanced in the conventional fashion to extend the call to the checking level such as level 8 in the connector bank. Upon the seizure of the checking circuit 8, ground applied in any suitable manner to sleeve lead $S_a$ from the connector effects the operation of sleeve relay 320 by way of sleeve lead $S_a$, normal contacts 313 and the upper winding of relay 320.

Responsive to the operation of relay 320, a circuit is completed for operating sleeve assist relay 310 from battery at the lower winding of relay 310 by way of operated contacts 324, lead B to the fire alarm circuit of Fig. 2, operated contacts 229 and operated contacts 273. The operation of relay 310 completes a locking circuit for relay 320 through the lower winding of relay 320, operated contacts 315, 325 and normal contacts 331. The operation of relays 320 and 310 in the alarm checking circuit effects the connection of a ring trip circuit for the connector from ground at resistor R31 through operated contacts 321*a* and 311 to tip lead $T_a$ to the connector, the return circuit comprising ring lead $R_a$, operated contacts 312 and 322*a* and resistor R32. The resistances of resistors R31 and R32 are so chosen that operation of the answer bridge relay in the connector is prevented.

The operation of relay 310 opens up the energizing winding of relay 320 at operated contacts 313. It should be noted that contacts 315 are preferably adjusted to make before contacts 313 open in order to transfer the holding circuit for relay 320 from contacts 313 to contacts 315.

In response to the operation of relay 310, relay 330 is also operated through thermistor T31 and operated contacts 326 and 316. The inclusion of the thermistor in the operating circuit for ring trip relay 330 makes that relay slow-to-operate. As soon as relay 330 completely operates, a shunting circuit about the thermistor T31 is completed at operated contacts 332.

Responsive also to the operation of relay 330, relay 320 is deenergized by the opening of the locking circuit at contacts 331. When relay 320 releases, the talking circuit from the connector to the forward loop is completed at normal contacts 321 and 322. The release of relay 320 also deenergizes relay 330 at now open contacts 326.

The calling volunteer can now converse with the operator although any means of apprising the volunteer of the location of the alarm may be employed such as by means of reproducing apparatus connected to the talking circuit. It is observed that the checking circuits as disclosed in Fig. 3 are multiplied so that a plurality of volunteers can call in without regard to the number already connected.

At any time during the interval between disconnect by the subscriber who phoned in the alarm information and disconnect by the fire alarm station operator, a second alarm call may be completed to the fire alarm station.

Assuming that another call has been extended, as by means of connector 4, while the fire alarm circuit 5 is still engaged, sleeve relay 210 operates as before from ground (not shown) over the sleeve lead S from the connector, thereby reoperating relay 210. The reoperation of relay 210 effects the de-energization of ring relay 230 at contacts 214. In response to the release, after a time delay, of relay 230, ring relay 240 is de-energized at contacts 231. During the release times of slow-to-release relays 230 and 240, the connector ring trip circuit including resistors R21 and R22 is connected to the connector tip and ring leads T and R at contacts 248 and 242, respectively, thereby tripping the ringing circuit in the connector and upon the release of relay 240, the transmission circuit is connected through to the fire alarm telephone at contacts 247 and 241, respectively.

Assuming that only one alarm call is extended to the alarm station, the alarm operator holds open the fire alarm circuit and the instrument 6 at the fire alarm station 22 until he believes that all checking calls have been made. When the alarm operator restores the telephone instrument at the fire alarm station, relays 250 and 260 are released by the opening of the loop to fire alarm station 22. The release of relay 250 effects the release of relay 280 at contacts 251. The release of relay 260 de-energizes slow-to-release relay 270 at contacts 261. The subsequent release of relay 270 de-energizes relay 220 at contacts 273 and relay 230 is de-energized by the opening of contacts 276. Relay 240 is de-energized upon the release of relay 230 at contacts 231.

When a checking party restores, the relays illustrated in Fig. 3 are released. It will be recalled that relays 320 and 330 were released at the completion of the extension of the call from the checking party to the fire alarm circuit. When the checking party disconnects, relay 310 is released by the disappearance of ground on the sleeve lead $S_a$.

Means is provided for enabling a checking party to contact the alarm operator even after the alarm operator has restored. Under this circumstance, there is no ground on lead B because the disconnection by the alarm operator has dismissed the fire alarm circuit of Fig. 2. Thus relay 320 operates from ground on lead $S_a$ but relay 310 remains released because of the absence of ground on lead B. The operation of relay 320 connects ground to lead A at operated contacts 327 and leads D and E to the fire alarm circuit of Fig. 2 are interconnected at operated contacts 329.

The application of ground to lead A effects the operation of relay 230 through normal contacts 214, relay 210 being released because of the absence of the call in the connector bank. The operation of relay 230 causes the operation of relay 240 by the closing of contacts 231. The operation of relay 240 results in the application of ringing current from source 21 to the ring lead R′ by way of the lower winding of relay 220, lead D, operated contacts 329, lead E, operated contacts 246, normal contacts 226 and the ring lead R′. The alarm station is rung as previously described and the operator at the alarm station may now answer the call and provide the checking caller with the necessary information. Upon answering of the call by the operator, the ring trip relay 220 is operated over the foregoing circuit, and locks through preliminary make contacts 224, lead F and operated contacts 319 or 333.

Means is provided at the alarm station for operating the alarm signal whether a call has been received or not. For this purpose, the "W" wiring is provided in Fig. 2. Whenever the operator at alarm station 22 removes his receiver, the loop across tip lead T′ and ring lead R′ is closed in the conventional manner. The operator may then depress key 23 as previously described in order to apply ground to tip lead T′, thereby effecting the operation of relay 250 through normal contacts 222 and 243 and the upper windings of relays 250 and 260 in series to ground thereby shunting the upper winding of relay 250. The lower winding of relay 250 however, is energized from battery by way of the lower windings of relays 260 and 250, normal contacts 245 and 226 and the ring lead R′ back to ground at the fire alarm station, the connection to ground extending through the loop at the station to ground at key 23.

The operation of relay 250 completes a circuit for operating signal control sleeve relay 280 from ground on the "W" wiring through operated contacts 251 to the winding of relay 280. As previously described, the operation of relay 280 completes at contacts 281 a circuit for operating the alarm signal.

In the absence of the "W" wiring, the alarm signal can be sounded only after the receipt of a call through the fire alarm circuit because the necessary ground for operating relay 280 must be obtained through the operation of relay 270 through the agency of ring trip relay 220.

The operation of a system embodying the principles of my invention in which a selector level is utilized for the alarm checking function is next described. In this situation a calling subscriber's call will be extended through a finder-selector link into the selector bank. In Fig. 1 there has been illustrated for convenience, the use of the eighth selector level as the alarm checking level. A call extended to that level is forwarded to alarm checking circuit 12 illustrated in detail in Fig. 4, the alarm checking circuit 12 having access to fire alarm circuit 9 which is identical to fire alarm circuit 5 and is illustrated in detail in Fig. 2.

In response to the seizure of alarm checking circuit 12, the calling bridge relay 410 is energized over the forward conductors $T_c$ and $R_c$ in a conventional manner. The operation of relay 410 effects the operation of release delay relay 430 over a circuit from ground including operated contacts 411, the winding of relay 430 and the battery. In response to the operation of relay 430, relay 420 is operated through its upper winding, operated contacts 434, lead B to the fire alarm circuit of Fig. 2, operated contacts 229 (it being assumed in this example that the fire alarm circuit 2 has been energized upon the extension of an alarm call from one of the subscribers connected into the system), and operated contacts 211 to ground. The operation of relay 420 connects tip lead $T_c$ to tip lead T″ extending to fire alarm circuit 9 and ring lead $R_c$ is connected to forward ring lead R″ at operated contacts 423. Relay 420 locks up through its lower winding, operated contacts 425 and 435 to ground.

In the absence of ground on lead B, indicative of an on-hook condition at alarm telephone or station 10, the operation of relay 430 connects ground to start lead ST by way of operated contacts 435 and normal contacts 426 to effect the operation of the ringing generator or other source of ringing current during the operate time of switching relay 420.

Means is provided for checking even after the alarm operator has hung up. In this situation, the relays of Fig. 2 are all de-energized and released as previously described. Relay 410 operates as described above over the calling loop and relay 430 operates over an obvious circuit. At this time, however, relay 420 does not operate because there is no ground on lead B since relays 210 and 220 of the fire alarm circuit are not operated. Therefore, means is provided for giving ringback tone to the calling subscriber from a suitable source (not shown) connected to lead RBT by way of capacitor C41, operated contacts 433 and normal contacts 422 to ring lead $R_c$.

The operation of relay 410 causes the operation of relay 230 over a circuit extending from ground at operated contacts 412 by way of lead A, normal contacts 214 and the winding of relay 230. Relay 230 operates and effects the energization and operation of relay 240 at contacts 231, thereby connecting the source of ringing current 21 through the lower winding of relay 220, lead D, normal contacts 427, operated contacts 436, lead E, operated contacts 246 and normal contacts 226 to ring lead R′, thereby ringing the fire alarm station. Under the assumption, sleeve relay 210 of the fire alarm circuit is unoperated because of the absence of ground on incoming sleeve lead S so that during the checking operation described above, a fire alarm call can come through to the fire alarm circuit even though the checking party may be connected to the alarm operator.

While there has been described what is at present considered the preferred embodiment of my invention, it will be understood that various modifications may be made in the structure thereof. Therefore, it is contemplated in the appended claims to cover all such modifications as fall within the true spirit and scope of my invention.

What I claim is:

1. In a telephone system, an alarm system comprising a subscriber's station, an alarm station, an alarm circuit, means utilizing said alarm circuit for extending a call from said subscriber's station to said alarm station, an alarm checking station, an alarm checking circuit and means utilizing said alarm circuit and said checking circuit for extending a call from said alarm checking station to said alarm station.

2. In an automatic telephone system, a plurality of subscribers' stations, an alarm station, means for extending a call from one of said subscribers' stations to said alarm station, means responsive to the extension of a call from one of said substations to said alarm station for making the connection busy to other subscribers for the duration of said conection, an alarm checking station, and means for extending a connection from said checking station to said alarm station without regard to the busy or idle condition of said alarm station and without disturbing a call which is in existence from said one of said subscribers' stations.

3. In a telephone system, a plurality of subscribers' stations, an impulse transmitter at each of said stations, an alarm station, means for extending a connection from one of said subscribers' stations to said alarm station, means responsive to the extension for normally making said connection busy to other substations for the duration of said connection, and means responsive to the transmission of a predetermined number of impulses from one or more of said subscribers' stations for extending a connection from said one or more of said subscribers' stations to said alarm station without regard to the idle or busy conditions of said alarm station and without disturbing a call which is in existence from said one of said subscribers' stations.

4. In a telephone system, a plurality of subscribers' stations, a plurality of connectors, an alarm station, an alarm circuit, means including one of said connectors for extending a call from one of said subscribers' stations to said alarm station by way of said alarm circuit, means responsive to a disconnect operation at said one subscriber's station for releasing said connector, means responsive to a disconnect operation at said alarm station for releasing said alarm circuit, means responsive to the initiation of another call from one of said subscribers' substations to said alarm station during the period following disconnect by the previous calling subscriber but before disconnection at said alarm station for extending another connection to said alarm circuit by way of one of said connectors, and means responsive to said extension of said another connection to said alarm circuit for completing a talking circuit to said alarm station without first ringing said alarm station.

5. In a telephone system, a plurality of subscribers' stations, a plurality of connectors, an alarm station, an alarm circuit, means including one of said connectors for extending a call from one of said subscribers' stations to said alarm station by way of said alarm circuit, ringing means, means normally responsive to the extension of said call to said alarm circuit for ringing said alarm station, means normally responsive to the answering of said call at said alarm station for tripping said ringing means, means responsive to the disconnect operation at said one of said substations for releasing said connector, means responsive to disconnect operation at said alarm station for releasing said alarm circuit, means responsive to the initiation of another call from one of said subscribers' substations to said alarm station during the period following disconnect by the previous calling subscriber but before disconnect at said alarm station for extending another connection to said alarm circuit by way of one of said connectors, and means responsive to said another extension while said alarm circuit is still seized for tripping ringing on said second call without ringing said alarm station.

6. In a telephone system, a plurality of subscribers' substations, an impulse transmitter at each substation, a plurality of connectors, a ring trip relay in each connector, an alarm station, an alarm circuit, means including one of said connectors for extending a call from one of said subscribers' substations to said alarm station by way of said alarm circuit, a relay in said alarm circuit, means responsive to seizure of said alarm circuit by one of said connectors for operating said alarm circuit relay, means responsive to the operation of said alarm circuit relay for busying said alarm circuit to further calls directed to the directory number of said alarm station during the busy condition thereof, means for thereafter ringing said alarm station, means responsive to answering said call at said alarm station for operating said ring trip relay in said connector in order to terminate ringing of said alarm station and to extend a metallic circuit from said connector to said alarm station, means for extending a call from one of said subscribers' stations to said alarm circuit in response to the transmission of a special checking number from said one subscriber's station without regard to the energization of said alarm circuit relay.

7. In a telephone system, a plurality of subscribers' substations, an impulse transmitter at each substation, a plurality of connectors, a ring trip relay in each connector, an alarm station, an alarm circuit, means including one of said connectors for extending a call from one of said subscribers' substations to said alarm station by way of said alarm circuit, a relay in said alarm circuit, means responsive to seizure of said alarm circuit by one of said connectors for operating said alarm circuit relay, means responsive to the operation of said alarm circuit relay for busying said alarm circuit to further calls directed to the directory number of said alarm station during the busy condition thereof, means for thereafter ringing said alarm station, means responsive to answering said call at said alarm station for operating said ring trip relay in said connector in order to terminate ringing of said alarm station and to extend a metallic circuit from said connector to said alarm station, and means for extending a call from a plurality of said subscribers' stations to said alarm circuit in response to the transmission of a special checking number from said plurality of subscribers' stations without regard to the energization of said alarm circuit relay.

8. In a telephone system, a plurality of subscribers' substations, an impulse transmitter at each substation, a plurality of connectors, a ring trip relay in each connector, an alarm station, an alarm circuit, means including one of said connectors for extending a call from one of said subscribers' substations to said alarm station by way of said alarm circuit, a relay in said alarm circuit, means responsive to seizure of said alarm circuit by one of said connectors for operating said alarm circuit relay, means responsive to the operation of said alarm circuit relay for busying said alarm circuit to further calls directed to the directory number of said alarm station during the busy condition thereof, means for thereafter ringing said alarm station, means responsive to answering said call at said alarm station for operating said ring trip relay in said connector in order to terminate ringing of said alarm station and to extend a metallic circuit from said connector to said alarm station, means for extending a call from one of said subscribers' stations to said alarm circuit in response to the transmission of a special checking number from said one subscriber's station without regard to the energization of said alarm circuit relay, means responsive to disconnect at said one subscriber's station for releasing said connector, means responsive to the release of said one connector for releasing said alarm circuit relay whereby said alarm circuit is again free to be seized by further calls directed to the directory number of said alarm station, means responsive to the extension of another call directed to the directory number of said alarm station following disconnect by said one subscriber but before disconnect by said alarm station operator for reoperating said alarm circuit relay, and means responsive to the reoperation of said alarm circuit relay for tripping ringing said one connector and extending a metallic circuit to said alarm circuit.

9. In an automatic telephone system, a plurality of subscribers' stations, an alarm station, means for extending a call from one of said subscribers' stations to said alarm station, means responsive to the extension of a call from one of said substations to said alarm station for making the connection busy to other subscribers for the duration of said connection, and means for extending a connection from any of the remaining subscribers' stations to said alarm station without regard to the busy or idle condition of said alarm station and without disturbing a call which is in existence from said one of said subscribers' stations.

References Cited in the file of this patent

UNITED STATES PATENTS

| | | |
|---|---|---|
| 1,780,617 | Crocker | Nov. 4, 1930 |
| 2,298,488 | Kiner et al. | Oct. 13, 1942 |
| 2,298,489 | Kiner | Oct. 13, 1942 |
| 2,332,290 | Baumfalk | Oct. 19, 1943 |